Dec. 16, 1958     S. U. PATTON     2,864,659

STAVE CONSTRUCTION FOR PROPELLER SHAFT BEARINGS

Filed March 4, 1955

INVENTOR
STEWART U. PATTON

BY George Sipkin
B. L. Zangwill
ATTORNEYS 2,864,659
Patented Dec. 16, 1958

2,864,659
STAVE CONSTRUCTION FOR PROPELLER SHAFT BEARINGS

Stewart U. Patton, Severna Park, Md.

Application March 4, 1955, Serial No. 492,323

8 Claims. (Cl. 308—238)

(Granted under Title 35, U. S. Code (1952), sec. 266)

The invention described herein may be manufactured and used by or for the Government of the United States of America for governmental purposes without the payment of any royalties thereon or therefor.

This invention relates to bearings for ships and more particularly to bearing stave construction for supporting a propeller shaft attached to a vessel.

The prior art discloses the use of stern tube and strut bearings for supporting a propeller shaft attached to a ship. These bearings, ranging in length from 8 to 12 inches in small boats and from 4 to 22 feet for large vessels, are of conventional design in which the staves of the bearing are of uniform density, thickness and construction throughout. As is well known, the propeller shaft for large ships is of considerable length and has a number of unsupported lengths between bearings. The weight of such unsupported lengths, in addition to that of the propeller blades and the imposition of large forces acting on the blades, creates a considerable amount of shaft sag and bending. This shaft sag or curvature, particularly where the shaft enters an end of the bearing, causes a greater compression of the rubber or elastomer at the bearing end and hence a greater reacting bearing load is developed which ultimately causes failure of the bearing. The undesirable effect of a shaft having a sag or curvature and being used in a bearing of uniform density, thickness and construction, is that the bearing is not capable of adjusting to the excessive pressure applied at the bearing ends by the shaft sag. As a consequence of the concentrated loads at an end of the relatively rigid bearing members, a failure of the bearing inevitably results.

The present invention eliminates the disadvantages of the prior art by relieving the excess bearing load at the stave ends. Such relief is accomplished by providing progressively greater compression of the rubber or elastomer toward the end of the stave, thereby permitting conformance to the contour of the shaft curvature and compensating for the greater loading at the stave ends.

It is therefore an object of the invention to provide uniform bearing loading in a propeller shaft installation.

Another object of the invention is the provision of a bearing for compensating for excessive bearing loading caused by shaft sag and bending.

Still another object of the invention is to provide a bearing stave capable of providing progressively greater compression of the stave surface near an end of the bearing.

Other objects and many of the attendant advantages of this invention will be readily appreciated as the same becomes better understood by reference to the following detailed description when considered in connection with the accompanying drawings wherein.

Figure 1:
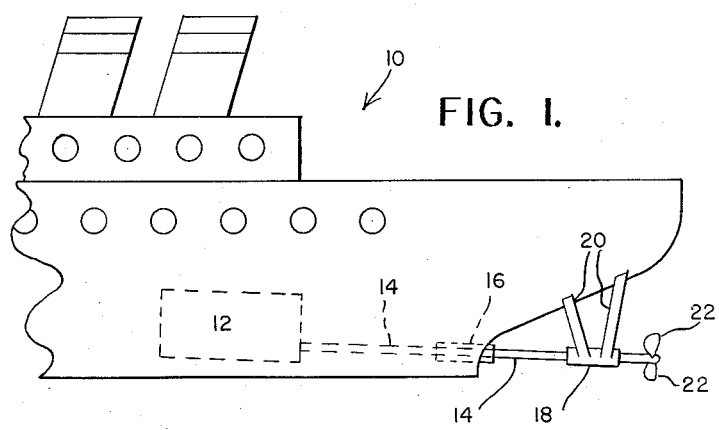
Fig. 1 is a view in elevation of a ship showing the propeller arrangement including stern tube and strut bearings for supporting the propeller shaft.

Referring now to the drawings, wherein like reference characters designate like or corresponding parts throughout the several views, there is shown in Fig. 1 a ship 10 provided with main propulsion machinery 12 located adjacent the stern end of the vessel. Propeller shaft 14 is connected at one end to machinery 12 and projects through a stern tube bearing 16 fitted in water tight relationship with the hull of the ship. Strut bearing 18 supports propeller shaft 14 exteriorly of the vessel and is attached to the hull by means of strut members 20; the propeller shaft terminating in a plurality of propeller blades 22.

Figures 2, 3:
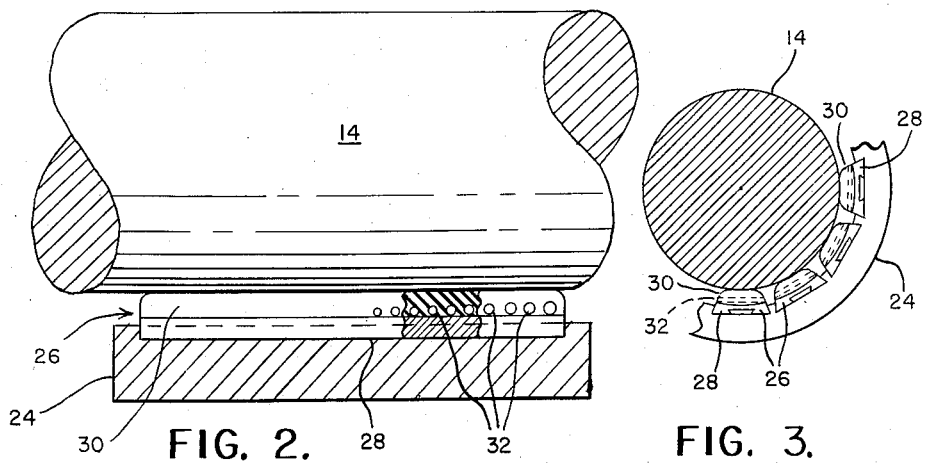
Fig. 2 is a view in elevation, partly in section, showing a section of propeller shaft mounted on the stave of a bearing.
Fig. 3 is an end view of the propeller shaft and bearing shown in Fig. 2.

Referring now to Figs. 2 and 3, there is shown a bearing housing 24 supporting a plurality of bearing staves 26 which extend longitudinally of the bearing housing. The bearing staves comprise a backing member 28 of bronze which fits in a dove-tailed slot in the housing. A rubber or elastomer member 30 adapted for contact by the shaft is bonded to the metal backing.

Figure 6:
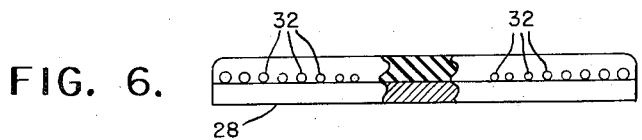
Fig. 6 is a side view of still another modification.

As more clearly shown in Fig. 2, each rubber member is provided with a plurality of transverse holes 32 extending on a line perpendicular to the longitudinal axis of stave 30. It will be noted that the holes increase progressively in size from approximately the center portion of the stave to an end thereof. These holes may also extend from the center to each end of a stave while increasing in diameter towards such ends, as shown in Figure 6.

It will be clear from reference to Figs. 2 and 3 that the stave is made more elastic and flexible by means of the holes 32 bored therethrough. Where a deflection or sag appears in a shaft at the point of entrance into the bearing, the staves, by virtue of their greater compression ratio, are capable of conforming to the contour of the shaft thereby relieving the load and eliminating the failure as has been common in the past.

Figures 4, 5:
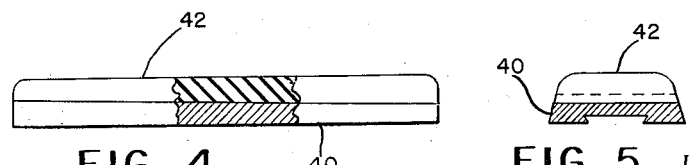
Fig. 4 is a modification of the stave shown in Fig. 2.
Fig. 5 is an end view of the stave shown in Fig. 4.

The modification shown in Figs. 4 and 5 serves the same function in substantially the same manner by permitting the end of the stave to be compressed where the shaft load is greatest. This is accomplished by providing a backing member 40 having a slope progressing along the longitudinal length of the stave. A rubber or elastomer facing member 42 having an opposite slope is bonded to the metal backing so as to provide a surface adapted for contact by the periphery of the rotating shaft. In operation, the end of the stave having the greater rubber thickness would be placed in the bearing adjacent the end subjected to excessive loading caused by curvature or sag in the propeller shaft.

Obviously many modifications and variations of the present invention are possible in the light of the above teachings. It is therefore to be understood that within the scope of the appended claims the invention may be practiced otherwise than as specifically described.

What is claimed is:

1. In combination, a compensating device for relieving excessive loading in an end of a bearing comprising a journal bearing housing, bearing means in said housing for supporting a shaft adapted for rotation therein, said bearing means including a flexible member adapted to be contacted by a journal on such a shaft, said bearing means having an outer surface in total contact with said housing, and means adjacent an end of said flexible member providing for greater compression than the remainder thereof, whereby said end of said flexible member is capable of deflection thereby permitting conformance to any sag curvature in a shaft.

2. In combination, a compensatory device for permitting a bearing to conform to the sag curvature of a shaft comprising a journal bearing housing, bearing means in said housing for supporting a shaft adapted for rotation therein, said bearing means comprising a plurality of longitudinally extending staves in said housing, each of said staves having an outer surface in total contact with said housing, each of said staves having a flexible surface and being provided with an end portion of greater compressibility than the remainder thereof, thereby permitting said staves to conform to the curvature of such a shaft at the point of entrance into said bearing.

3. The combination according to claim 2 wherein said end portion of each of said staves is provided with a plurality of openings extending transversely of said staves.

4. The combination according to claim 2 wherein said end portion of each of said staves is provided with a plurality of transverse openings progressively decreasing in diameter from the outermost portion to a midpoint of each of said staves.

5. The combination according to claim 2 wherein each of said staves is provided with a flexible material and progressively increases in thickness along its longitudinal length.

6. A bearing adapted to conform to the sag curvature in a shaft comprising, a housing, bearing means in said housing adapted to directly contact a shaft, said bearing means comprising a plurality of staves extending longitudinally of said housing, each of said staves having an outer surface in total contact with said housing, each of said staves having a flexible bearing surface and having end portions of greater compressibility than the remainder thereof, thereby permitting said staves to conform to the curvature of a shaft at the points where it leaves the bearing.

7. A bearing as set forth in claim 6 wherein an end portion of each of said staves is provided with a plurality of openings extending transversely of said stave.

8. A bearing as set forth in claim 6, wherein said end portions of each of said staves are provided with a plurality of transverse openings progressively decreasing in diameter from the outermost portion to a midpoint of each of said staves.

References Cited in the file of this patent

UNITED STATES PATENTS

| | | |
|---|---|---|
| 1,885,339 | Evans | Nov. 1, 1932 |
| 1,895,936 | Merrill | Jan. 31, 1933 |
| 2,295,139 | Topanelian | Sept. 8, 1942 |

FOREIGN PATENTS

| | | |
|---|---|---|
| 1,070,485 | France | July 24, 1954 |